(12) United States Patent
Bourque

(10) Patent No.: US 10,119,791 B2
(45) Date of Patent: Nov. 6, 2018

(54) REINFORCED METAL ALLOY FOR ENHANCED ARMOR PROTECTION

(71) Applicant: James C. Bourque, Biloxi, MS (US)

(72) Inventor: James C. Bourque, Biloxi, MS (US)

(73) Assignee: NUTECH METALS AND ALLOYS, LLC, Biloxi, MS (US)

( * ) Notice: Subject to any disclaimer, the term of this patent is extended or adjusted under 35 U.S.C. 154(b) by 0 days.

(21) Appl. No.: 15/625,759

(22) Filed: Jun. 16, 2017

(65) Prior Publication Data

US 2017/0363394 A1    Dec. 21, 2017

Related U.S. Application Data

(60) Provisional application No. 62/351,735, filed on Jun. 17, 2016.

(51) Int. Cl.
| | |
|---|---|
| *F41H 5/04* | (2006.01) |
| *B22D 19/02* | (2006.01) |
| *B29C 70/86* | (2006.01) |
| B29K 705/02 | (2006.01) |
| B29K 309/02 | (2006.01) |
| B29L 31/00 | (2006.01) |

(52) U.S. Cl.
CPC .......... *F41H 5/0464* (2013.01); *B22D 19/02* (2013.01); *B29C 70/86* (2013.01); *B29K 2309/02* (2013.01); *B29K 2705/02* (2013.01); *B29K 2995/0046* (2013.01); *B29L 2031/768* (2013.01)

(58) Field of Classification Search
CPC ................. F41H 5/0457; F41H 5/0464; B29C 70/86–70/865
See application file for complete search history.

(56) References Cited

U.S. PATENT DOCUMENTS

| | | | | |
|---|---|---|---|---|
| 4,760,611 A | * | 8/1988 | Huet | B32B 15/00 |
| | | | | 2/2.5 |
| 5,272,954 A | * | 12/1993 | Crouch | F41H 5/0457 |
| | | | | 109/49.5 |
| 5,604,266 A | * | 2/1997 | Mushovic | B29C 44/3446 |
| | | | | 521/122 |

(Continued)

FOREIGN PATENT DOCUMENTS

CN              104314866 A  *  1/2015  ............. F04D 29/30

OTHER PUBLICATIONS

"Incotelogy Basalt Fiber Products", Incotelogy GmbH, 2014, pp. 6 and 12.*

(Continued)

*Primary Examiner* — Stephen Johnson
*Assistant Examiner* — Joshua T Semick
(74) *Attorney, Agent, or Firm* — Fitch, Even, Tabin & Flannery, L.L.P.

(57) ABSTRACT

An armor plate is provided having a lamination of an embedded reinforcement basalt fiber mesh within a laminated cast metal alloy; and at least two layers of an aramid fiber. A process to make the armor plate can include suspending a basalt weave within a mold; heating aluminum 6061 or 7075 alloy to a molten state; pouring the molten aluminum into the mold; cooling the resultant matrixed aluminum to ambient temperature; and laminating at least two layers of ballistic fiber to the matrixed aluminum.

5 Claims, 11 Drawing Sheets
(1 of 11 Drawing Sheet(s) Filed in Color)

(56) References Cited

U.S. PATENT DOCUMENTS

| | | | | |
|---|---|---|---|---|
| 5,616,650 | A * | 4/1997 | Becker | C08G 18/10 525/102 |
| 6,723,279 | B1 * | 4/2004 | Withers | A63B 53/04 419/12 |
| 7,730,548 | B1 * | 6/2010 | McCraney | F41H 5/0407 2/2.5 |
| 8,043,982 | B2 * | 10/2011 | Telander | B32B 5/16 428/911 |
| 8,956,711 | B2 * | 2/2015 | Musaefendic | B32B 15/08 428/136 |
| 2013/0319214 | A1 * | 12/2013 | Kopan | F41H 5/0478 89/36.02 |
| 2017/0246849 | A1 * | 8/2017 | Ilinich | B32B 37/06 |

OTHER PUBLICATIONS

"AR500 Armor Level IV Composite Body Armor Curved—10"×12"", lapolicegear.com, Apr. 14, 2016.*

Machine Translation of CN-104314866-A (Year: 2015).*

* cited by examiner

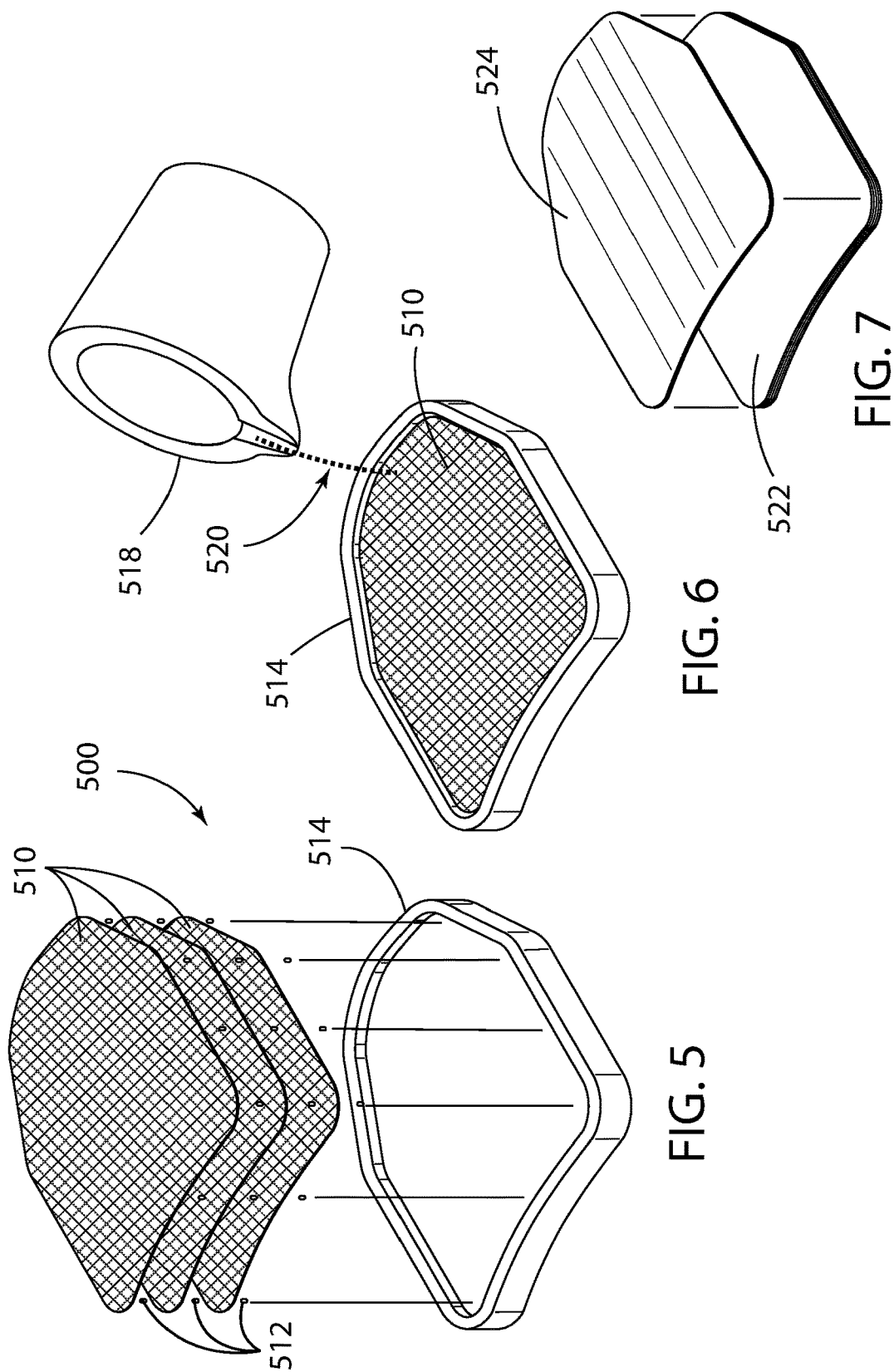

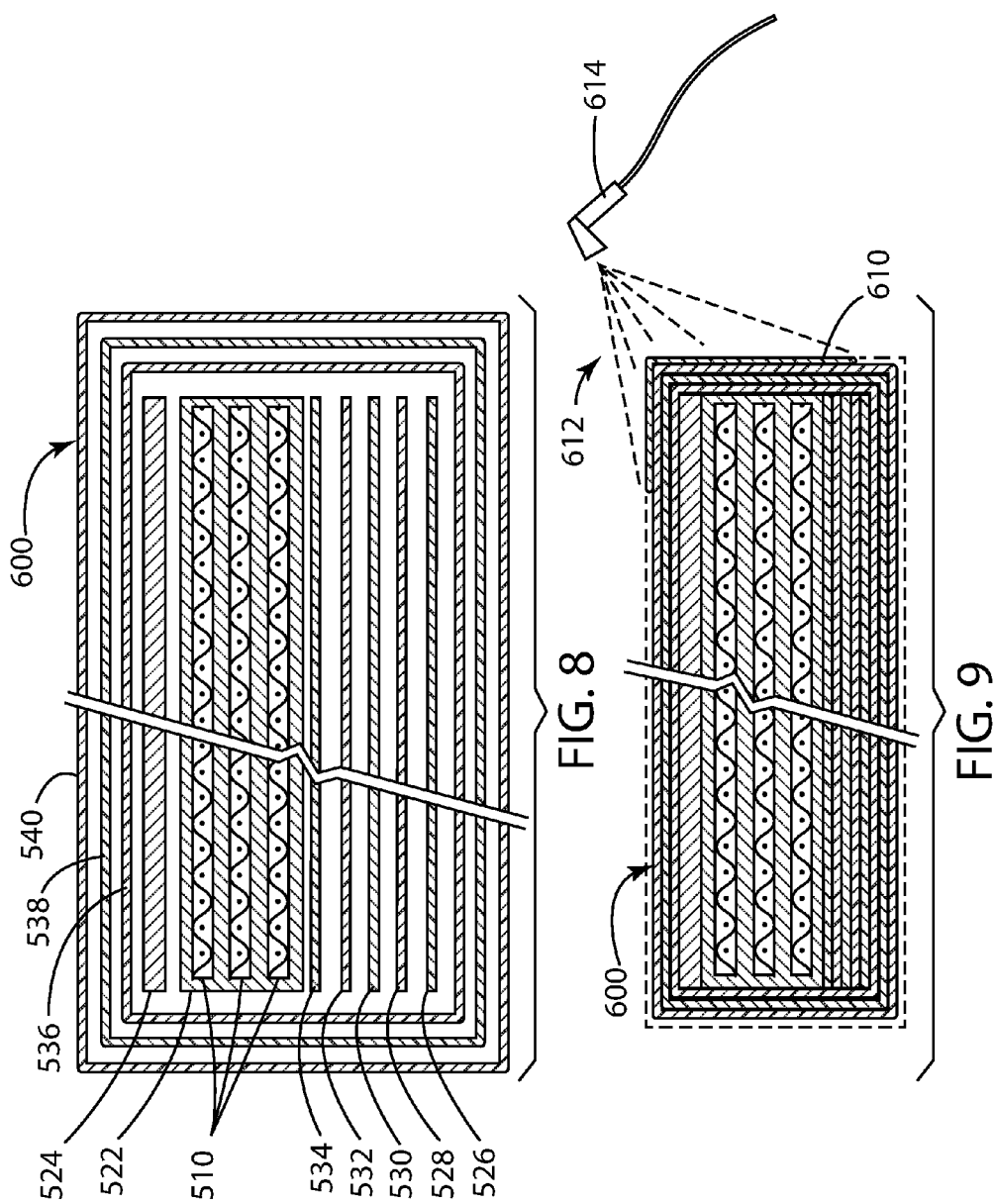

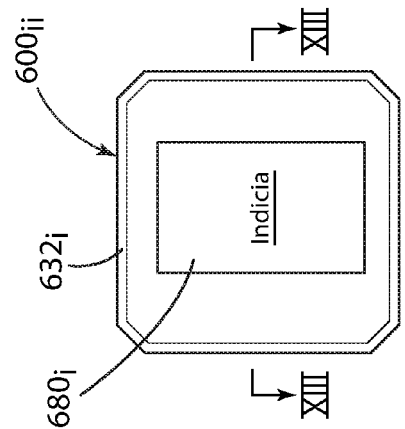
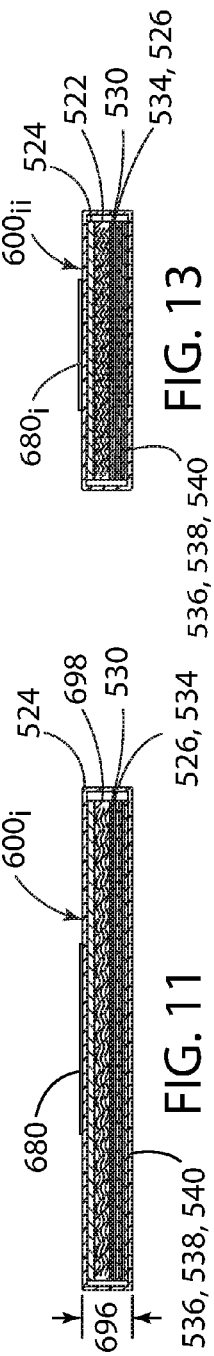
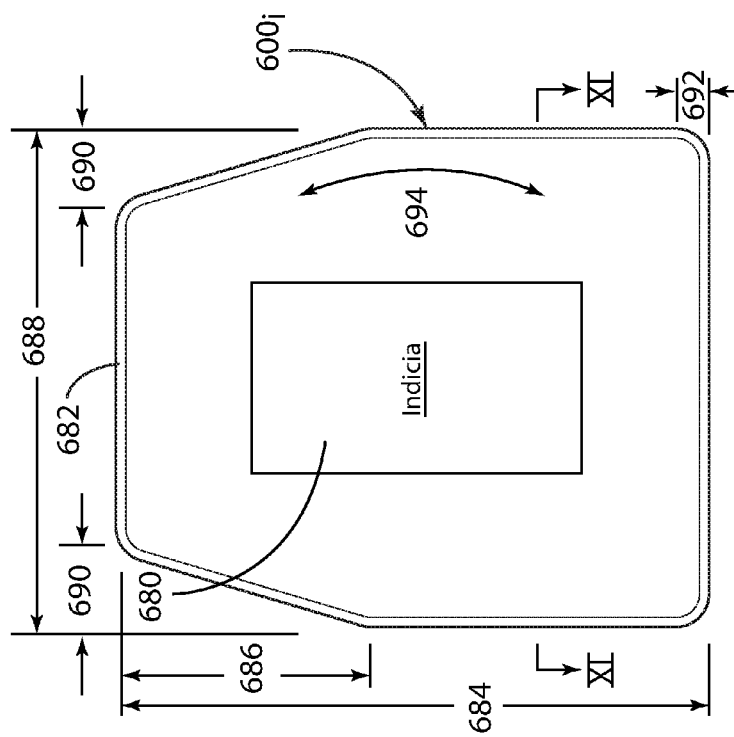
FIG. 10 FIG. 11 FIG. 12 FIG. 13

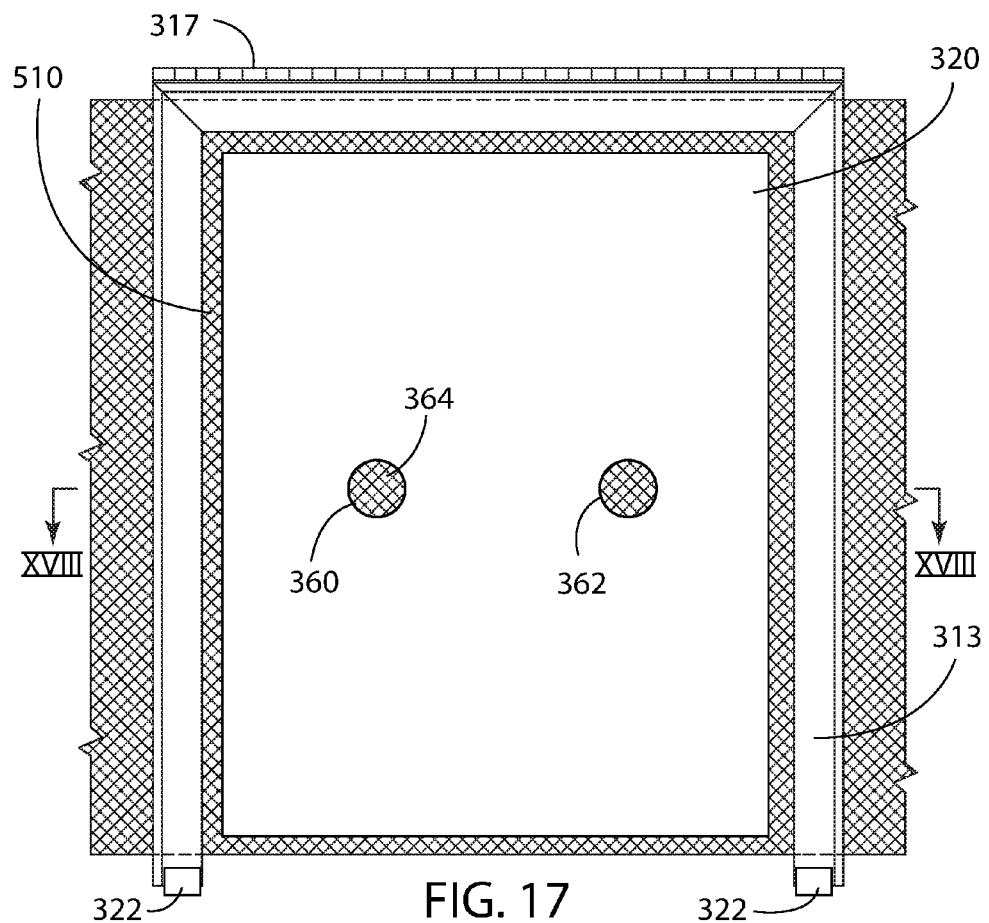
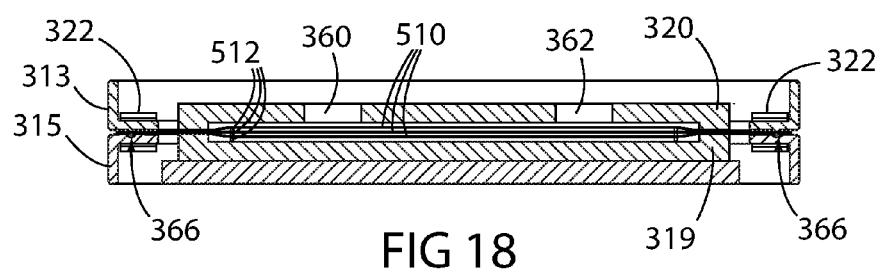

| TABLE:<br>SYSTEM ASSEMBLY - LAYER | | THICKNESS (IN) | THICKNESS (IN) | DIMS | WT (LBS) | DIMS |
|---|---|---|---|---|---|---|
| Threat Level IIIA (plus) | | | | | | |
| WRAP 1 | | | | | | |
| Spectra Shield SR-1226 - Inner Wrap | | 0.0625 | 1/16 | 12" x 12" | | 10.5" x 11.5" |
| Matrixed Aluminum | | 0.3750 | 3/8 | 12" x 12" | | 10.5" x 11.5" |
| WRAP 2 | | | | | | |
| Spectra Shield SR-1226 - Inner Wrap | | 0.0625 | 1/16 | 12" x 12" | | 10.5" x 11.5" |
| Kevlar sheets (8) | 1 | 0.0090 | 8/889 | 12" x 12" | 0.0972 | 10.5" x 11.5" |
| | 7 | 0.0630 | 8/127 | 12" x 12" | 0.6804 | 10.5" x 11.5" |
| WRAP 3 | | | | | | |
| Kevlar sheets (3) - Outer Wrap | | 0.0625 | 1/16 | 12" x 12" | | 10.5" x 11.5" |
| Rhino Spray Coating | | 0.0625 | 1/16 | 12" x 12" | | 10.5" x 11.5" |
| TOTALS: | | 0.6970 | 0.6970 | 0.0000 | 0.7776 | 0.6521 |
| Threat Level IIIA (plus) | | | | | | |
| WRAP 1 | | | | | | |
| Spectra Shield SR-1226 - Inner Wrap | | 0.0625 | 1/16 | 12" x 12" | | |
| Titanium sheet - Grade 5 | | 0.0280 | 7/250 | 12" x 12" | 0.6572 | |
| Matrixed Aluminum | | 0.3750 | 3/8 | 12" x 12" | | |
| WRAP 2 | | | | | | |
| Spectra Shield SR-1226 - Inner Wrap | | 0.0625 | 1/16 | 12" x 12" | | |
| Kevlar sheets (8) | 1 | 0.0090 | 8/889 | 12" x 12" | 0.0972 | |
| | 7 | 0.0630 | 8/127 | 12" x 12" | 0.6804 | |
| WRAP 3 | | | | | | |
| Kevlar sheets (3) - Outer Wrap | | 0.0625 | 1/16 | 12" x 12" | | |
| Rhino Spray Coating | | 0.0625 | 1/16 | 12" x 12" | | |
| TOTALS: | | 0.7250 | 0.7250 | 0.0000 | 1.4348 | 1.2031 |
| Threat Level IIIA (plus) | | | | | | |
| WRAP 1 | | | | | | |
| Spectra Shield SR-1226 - Inner Wrap | | 0.0625 | 1/16 | 12" x 12" | | |
| Stainless Steel - 18 gauge - Type 304 or 316 | | 0.0480 | 6/125 | 12" x 12" | 2.0160 | |
| Matrixed Aluminum | | 0.3750 | 3/8 | 12" x 12" | 5.238 | |
| WRAP 2 | | | | | | |
| Spectra Shield SR-1226 - Inner Wrap | | 0.0625 | 1/16 | 12" x 12" | | |
| Kevlar sheets (8) | 1 | 0.0090 | 8/889 | 12" x 12" | 0.0972 | |
| | 7 | 0.0630 | 8/127 | 12" x 12" | 0.6804 | |
| WRAP 3 | | | | | | |
| Kevlar sheets (3) - Outer Wrap | | 0.0625 | 1/16 | 12" x 12" | | |
| Rhino Spray Coating | | 0.0625 | 1/16 | 12" x 12" | | |
| TOTALS: | | 0.7450 | 0.74500 | 0.00000 | 8.03160 | |
| Threat Level IIIA (plus) | | | | | | |
| WRAP 1 | | | | | | |
| Spectra Shield SR-1226 - Inner Wrap | | 0.0625 | 1/16 | 12" x 12" | | |
| Stainless Steel - 18 gauge - Type 304 or 316 | | 0.0480 | 6/125 | 12" x 12" | 2.0160 | |
| Matrixed Aluminum | | 0.3750 | 3/8 | 12" x 12" | | |
| WRAP 2 | | | | | | |
| Spectra Shield SR-1226 - Inner Wrap | | 0.0625 | 1/16 | 12" x 12" | | |
| Kevlar sheets (8) | 1 | 0.0090 | 8/889 | 12" x 12" | 0.0972 | |
| | 7 | 0.0630 | 8/127 | 12" x 12" | 0.6804 | |
| WRAP 3 | | | | | | |
| Kevlar sheets (3) - Outer Wrap | | 0.0625 | 1/16 | 12" x 12" | | |
| Rhino Spray Coating | | 0.0625 | 1/16 | 12" x 12" | | |
| TOTALS: | | 0.7450 | 0.74500 | 0.00000 | 2.79360 | |

FIG. 19

REINFORCED METAL ALLOY FOR ENHANCED ARMOR PROTECTION

CROSS-REFERENCE TO RELATED APPLICATION

This application is a Non-provisional Application of U.S. Application No. 62/351,735, filed on Jun. 17, 2016, the disclosure of which is incorporated herein by reference in its entirety.

FIELD

This application relates generally to body and vehicular armor, specifically to a method of enhancing base metal alloy for improved energy absorption, strength-to-weight ratio and ballistic resistance performance. Designs and methods are provided for an enhanced base metal for hard armor panel assembly.

BACKGROUND

With the ever changing military and law enforcement conflicts and advanced ballistic technologies, evolving needs for improved armor protection for both personnel and vehicle systems have increased. Military and security personnel demand improved performance and reductions in equipment weight. The armor industry has struggled to develop a system that is reliable and meets these critical, life-saving expectations.

Armor designed to protect against projectile penetration can be made out of a variety of materials. Historically, metal-based armor was used for most armor applications. Current typical ballistic resistant plate technology can incorporate a ceramic based plate adhered to a substrate. The plates, known as SAPI (small arms protective inserts) or ESAPI (enhanced small arms protective insert) can be placed within a fabric carrier vest system for personal protection at the front, back and sides of a wearer's torso. (See generally, https://en.wikipedia.org/wiki/ Small_Arms_Protective_Insert) For example, the United States Army has issued requests and solicitations for improved ballistic plate technology to be known as XSAPI which will provide greater coverage and reduced weight. Accordingly, there is a desire and need in the art to address these requests and solicitations in the next generation of SAPI protection.

SUMMARY

The present embodiments include methods to produce a reinforcement lamination for a metal alloy to be used for ballistic resistant armor applications such as personnel or vehicular armor plates.

According to one approach, an armor plate can be a lamination of an embedded reinforcement basalt fiber mesh within a laminated cast metal alloy; and at least two layers of an aramid fiber. The armor plate may also have at least at least one titanium layer. In one embodiment the armor plate may also have a ballistic fiber wrap. The armor plate may also have a metal alloy that is aluminum 6061 or 7075. The armor plate may also have an optional 10 mil blast mitigation and protective coat. The armor plate may also have a label on a side of the plate configured to be the strike face surface, the label identifying the strike face and a standardized classification and any other desired indicia. The armor plate may also have at least one titanium layer that is $1/16$" thick. The basalt fiber mesh opening can be between $1/8$" and $3/8$" square. The laminated cast metal alloy can be $3/8$" thick.

According to another approach, a method of making an armor plate can include the steps of suspending a basalt weave within a mold; heating aluminum 6061 or 7075 alloy to a molten state; pouring the molten aluminum into the mold; cooling the resultant matrixed aluminum to ambient temperature; and laminating at least two layers of ballistic fiber to the matrixed aluminum. In some embodiments the aluminum can be heated to about 1,400 degrees Fahrenheit. In some embodiments, the laminate may further have the step of vacuum infusing an elastic resin to seals all the lamination seams. The step of suspending a basalt weave within a mold can use caplets or other types of spacers. A step of spraying the armor plate with a blast mitigation and protective coat may also be included.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing features, as well as other features, will become apparent with reference to the description and figures below, in which like numerals represent like elements, and in which:

FIG. 5 illustrates a perspective view of an exemplary mold embodiment according to one approach with the basalt mesh.

FIG. 6 illustrates a perspective view of the exemplary mold of FIG. 5 with the basalt mesh disposed therein for casting of molten aluminum.

FIG. 7 illustrates a perspective view an exploded view of the molded matrix aluminum of FIG. 6 with a titanium plate.

FIG. 8 illustrates an exploded partial cross section of an assembled plate of an exemplary embodiment according to one approach.

FIG. 9 illustrates a partial cross section of an exemplary embodiment according to the embodiment of FIG. 8 with an application of a blast mitigation and protective spray on coating.

FIG. 10 illustrates a plan view of an exemplary armor plate embodiment according to one approach.

FIG. 11 illustrates a cross sectional view of the armor plate of FIG. 10 taken along section lines XI-XI.

FIG. 12 illustrates a plan view of an exemplary armor plate embodiment according to one approach.

FIG. 13 illustrates a cross sectional view of the armor plate of FIG. 12 taken along section lines XII-XIII.

FIGS. 15-18 illustrate and an exemplary embodiment of a molding device according to one approach.

FIG. 19 illustrates a Table including color markings.

Figure 1:
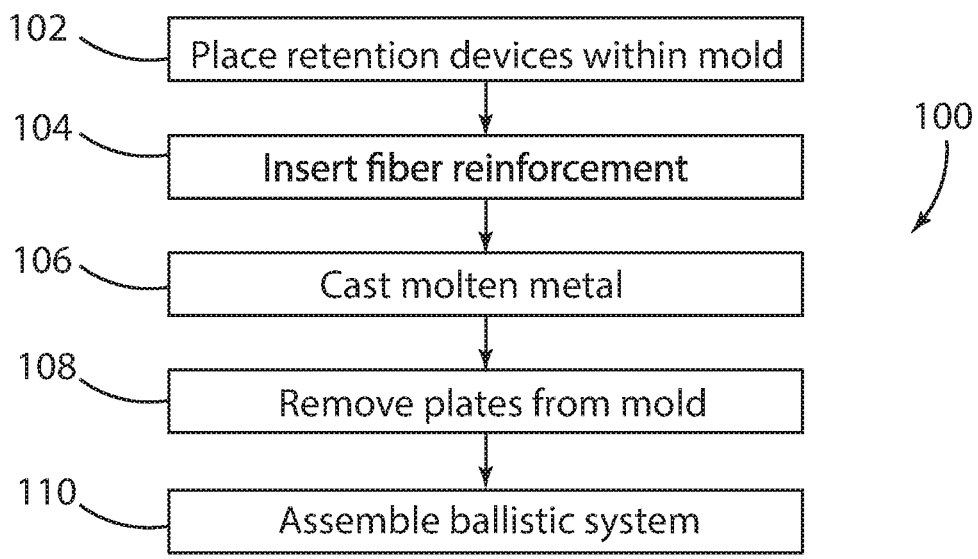
FIG. 1 illustrates an exemplary flow chart depicting a general assembly process of the present invention in a typical embodiment.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

With the ever changing military and law enforcement theatres, evolving needs for improved armor protection for both personnel and vehicle systems have increased to meet lighter weight and higher performance expectations. The exemplary metal alloys and methods described herein and depicted in the figures are configured to meet these increased expectations.

The present embodiments include methods to produce a reinforcement lamination for a metal alloy to be used for ballistic resistant armor applications such as personnel or vehicular armor plates. In one embodiment the base metal is configured with mesh reinforcement (e.g., carbon fiber or basalt) within the layer (including a cast layer) to provide enhanced strength and energy absorption characteristics.

According to one approach, through innovative nano-structured alloy assembly development, some embodiments can enhance the material performance characteristics of the base metal for use in defense armor applications. Although the present embodiments and assembly principles are described for armor applications, it is noted that these embodiments and methods may also be applied to industrial, structural applications, and the like where improved strength to weight ratios are of critical importance.

One aspect of the invention includes a process for embedding a reinforcement fiber mesh such as, but not limited to, carbon fiber or basalt fiber within a cast metal alloy, such as but not limited to, aluminum 6061 or 7075 alloy. Other base metals may be used for enhanced performance characteristics. Within this embodiment, the mesh may be suspended within the mold prior to casting and held in place during casting with metal standoffs or nibs or caplets or other types of spacers to help to maintain the position of the reinforcement to ensure coverage at both sides of the reinforcing material. Following the casting process, the plate is allowed to cool and removed from the mold. In one embodiment, the plates can be prepared with a finish edge treatment such as weld and then wrapped with an aramid fiber or ballistic composites wrap such as a ballistic wrap sold under the tradename SPECTRA/SPECTRA GOLD (by Honeywell of Colonial Heights, Va.), or DYNEEMA (by Royal DSM of the Netherlands). In a preferred embodiment, the finish edge can be infused with a resin. Depending on the targeted threat level, a layered backup system may be incorporated in some embodiments having of a series of ballistic fabric materials such as a ballistic foam or an aramid fiber sold under the tradename KEVLAR (by DuPont) or any various types of ultra-high-molecular-weight polyethylene (UHMWP) polymers.

The present embodiments provide several advantages over the known art. One key advantage is the comparative lightweight nature of the product with enhanced strength-to-weight performance of the assembly. This factor will allow military, police and security personnel to wear the protective gear for longer periods of time without additional strain of carrying added weight. Another advantage is its ability to potentially withstand multiple ballistic rounds. This innovation will allow soldiers, police or other security forces to remain engaged in conflict without the immediate need to take cover, retreat, or otherwise disengage in order to replace the damaged gear. And yet another advantage is its ability to absorb ballistic rounds received at an angle (its "obliquity") (e.g., 0 to about 20 degrees from perpendicular) rather than ricocheting the bullet to potentially cause additional harm once deflected. For example, ceramic based armor plates can frequently deflect bullets into the wearer's arm, torso or neck, or into a fellow soldier in an adjacent position. Capturing a bullet round enhances the safety of those seeking protection. The composite nature of the reinforced metal further improves flexibility, strength and resistance to deformity and failure.

The present embodiments involve matrixed aluminum configured, for example, to be utilized in conjunction with product applications to meet various military and law enforcement expectations for lighter weight and highly capable body armor. It is known that matrixed aluminum, by itself, cannot meet the performance criteria for the higher threat level applications. However, the present embodiments' added layers which synergistically interact together to reinforce the design, define and refine the layup applications to result in a final process and product. Materials needed according to one approach can include a matrixed aluminum plate—6×"6"×⅜" ("=inches), SPECTRA Cloth, KEVLAR, a blast mitigation and protective spray on (or dipped) coating such as a RHINO COATING (by Rhino Linings Industrial), and optionally labels to indicate strike face and ratings.

According to another approach, a wearable-enhanced-protective-system (WEPS) can be a laminated series of layers functioning homogeneously to mitigate Level 3A ballistic threats. These can include 9 mm FMJ, .357 SIG/FMJ and 44 MAG/SJHP as well as the 5.52 FMJ Rifle Round shot at 49 feet from an AR15 Assault Rifle. This gives the System a Level 3A+ Rating based on National Institute of Justice (NIJ) Criteria. The WEPS system of the current embodiments can be a series of laminations and coatings. According to one approach, the system can have a titanium strike face that is the initial surface contact a round would encounter to significantly degrade the level 3A rounds so that the subsequent layers can further degrade and capture the round with limited backface deformation and no penetration.

FIG. 1 illustrates a flow chart depicting a general assembly process 100 of the present invention in a typical embodiment. As shown, at step 102 retention devices can be placed within the mold to maintain the position of reinforcement during casting. Next at step 104, a fiber insert can be inserted within the mold. Next a step 106, molten metal can be cast within the mold at about, for example, 1,400 degrees Fahrenheit. In any event the metal to be cast in the mold needs to be to a temperature that it is flowable into the mold, and through and around, the basalt mesh. Next, at step 108 the mold plates are cooled to ambient temperature and can be removed followed by step 110 to assemble the molded plate into a ballistic system.

Figure 2:
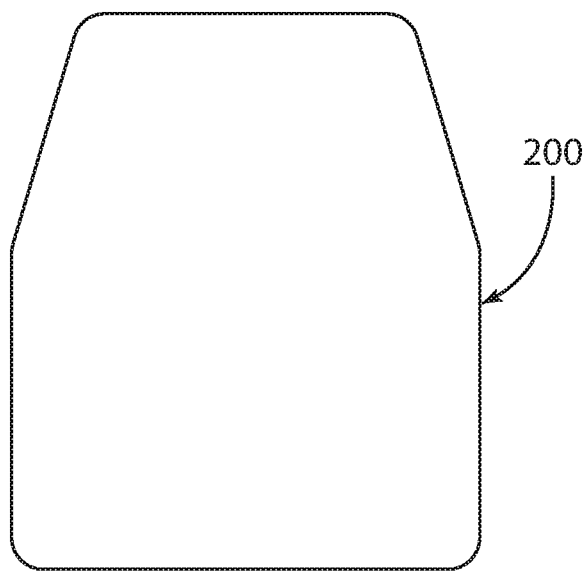
FIG. 2 illustrates a plan view of a typical prior art armor plate known in the industry as a small arms protective insert (SAPI) plate.

FIG. 2 illustrates an exemplary plan view of a typical prior art armor plate known in the industry as a small arms protective insert (SAPI) plate for mounting at the front into an armor vest carrier system. For convenience the enhanced base metal layers shown are in the shape of a SAPI (e.g., 6"×6"×⅜" or 10"×12"×⅜'), however the enhanced base metal layers may take any shape needed for a particular armor panel.

Figure 3:
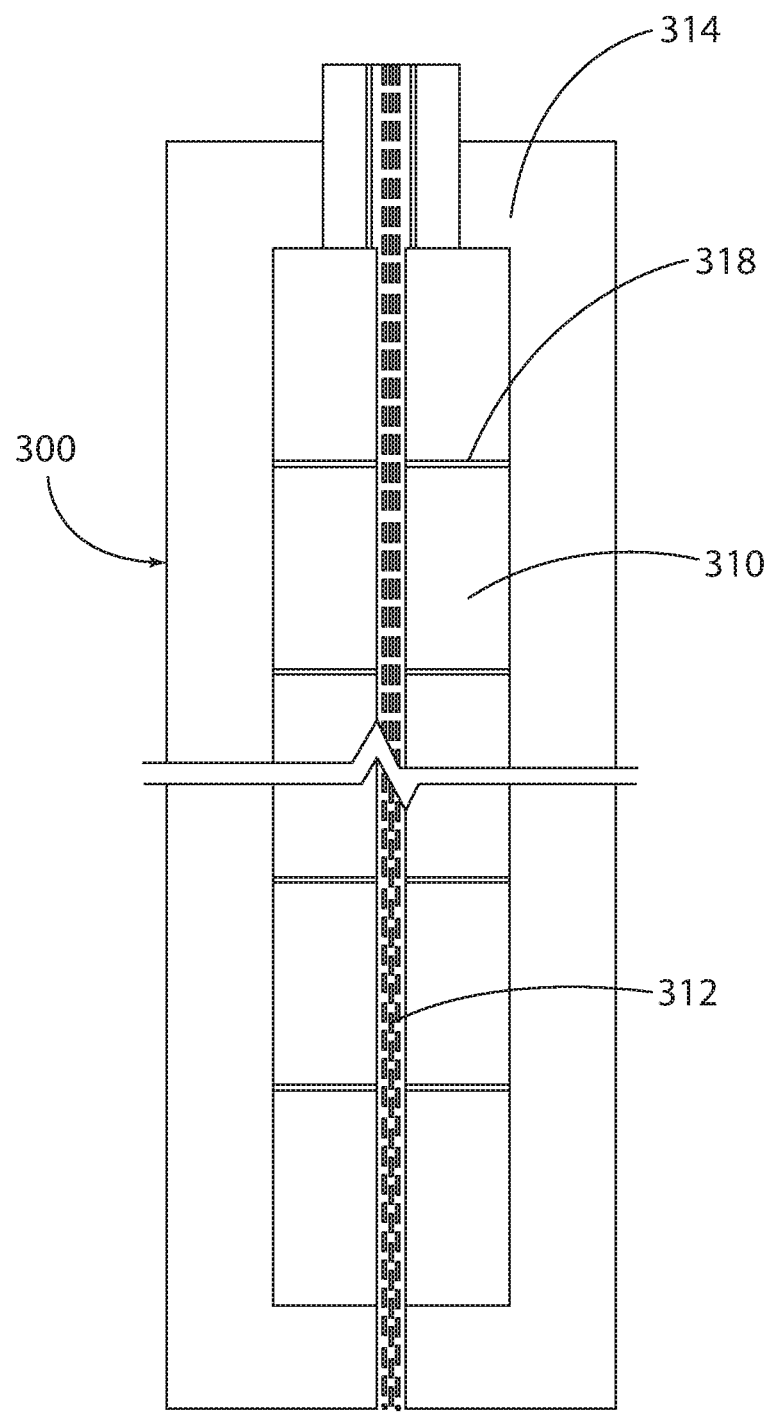
FIG. 3 illustrates an exemplary cross-sectional view of the enhanced base metal within the mold of an exemplary embodiment according to one approach.

FIG. 3 illustrates an exemplary cross-sectional view of the enhanced base metal within a mold. In this embodiment, basalt or carbon fiber mesh has been suspended within a cast metal. FIG. 3 shows a mold assembly generally indicated at 300, which includes a steel or other metal mold 314; a metal alloy (such as aluminum 6061) 310; carbon fiber mesh, basalt fiber mesh, or other reinforcing mesh 312; and mold apparatus to maintain position of reinforcement during casting 318.

Figure 4:
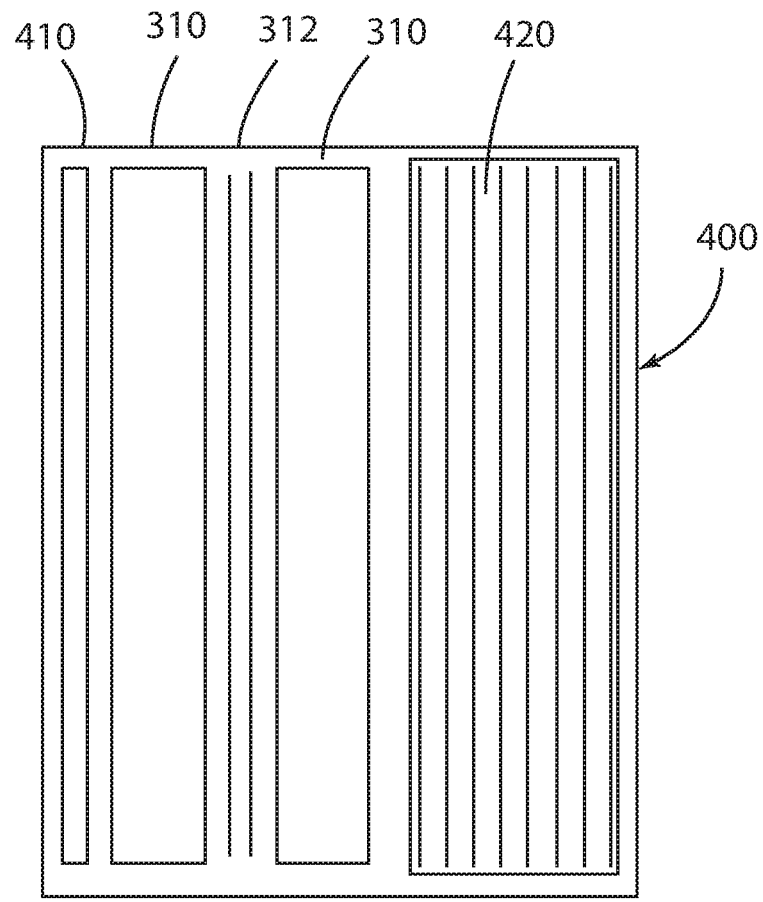
FIG. 4 illustrates an expansible energy absorbing layer for use in conjunction with a hard armor construction such as that of FIG. 3 of an exemplary embodiment according to one approach.

FIG. 4 illustrates an exemplary embodiment of an expansible energy absorbing layer 400 for use in conjunction with a hard armor construction such as that of FIG. 3. The layer 410 may be constructed of various sheet metals including titanium (including Grade II or grade V titanium), stainless steel, cold-rolled steel or the like. Alternatively, the layer 410 may be constructed of various lighter weight fabric composite materials. Layer 420 can be a ballistic fiber wrap.

According to another approach shown in FIGS. 5-7, a layered series of matrixed aluminum (MAL) is provided. As shown in FIG. 5, an ergonomically shaped (i.e., configured to contour the shape of the user where it is positioned or to give the plate a curvature for a more comfortable application with the contours of a user's body) mold 514 can receive, for example, three layers of a mesh material, such as a basalt mesh 510 at about 1/16" to ¾" and preferably about ⅛" in thickness. The basalt mesh 510 can be a weave or separated into layers. As shown in FIG. 5, the basalt mesh 510 can optionally be held in place with caplets 512 positioned as sacrificial components to hold the basalt mesh 510 in place during the pouring. In one embodiment shown in FIG. 6, the matrixed aluminum 520 can be a 6061 series grade aluminum, which is melted for this alloy to about 1,400 degrees F. The basalt mesh (or three separate mesh layers) 510 can be positioned in the center (or near the center) of mold 516. The molten aluminum 520 can be poured from vessel 518 into mold 514 and allowed to cool to ambient temperature before extraction. The extraction can produce, for example, a 12"×12"×⅜" plate 522 (FIG. 7) with the integrated basalt mesh that can then be processed to the design dimensions for the product and to receive additional laminations to achieve the desired specifications. For illustrative purposes, plate 522 can receive a titanium plate 524.

As shown in FIGS. 8 and 9, the matrixed aluminum plate 522 can then be integrated with an alternating layered/stacked system of KEVLAR and SPECTRA GOLD with titanium sheet of about 1/32" to ¾" in thickness of KEVLAR (preferably about 1/16") in the middle that is laminated to create a layered thickness of "⅛to 1", preferably about ⅜". These stacked layers can then be wrapped with, for example, 3 layers of KEVLAR and then vacuum infused with an elastic resin that seals all seams to create the homogeneous plate 600. These aramid fiber and UHMW products work together to capture the ballistic rounds and disperse the energy transferred to the wearer. As shown in FIG. 8 in exploded view to show detail of an exemplary lamination (shown as a laminate in FIG. 9) 600, having the three KEVLAR wraps 536, 538 and 540 around the entire plate, a titanium plate 522, the matrixed aluminum plate 522 with its three layers of basalt fibers 510; a first blast mitigation fiber SPECTRA GOLD sheet 534, a second Kevlar plate 532, a second titanium sheet 530, a second blast mitigation fiber SPECTRA GOLD sheet 528, and an additional KEVLAR sheet 526. The sheets can the about 1/32" to ¼", and preferably about 1/16" in thickness depending to the desired certification rating and blast absorption desired for the plate.

Finally, as shown in FIG. 9, a completed plate 600 can be dipped/sprayed (612) by nozzle 614 with a 5-50 mil, preferably a 10 mil, thick LINEX/RHINO coating 610 that ensure the mitigation of any spalling and provides the aesthetic features to the final product. Products can then be inspected for quality and a decal is adhered to the plate identifying the strike face and the threat level certifications and warnings.

FIGS. 10 and 12 show other exemplary plate configurations with a cross section of each respectively in FIGS. 11 and 13 showing the lamination arrangement. The plate of FIG. 10 can, for illustrative purposes only, can be 11.5" tall 684, angled corners of about 4" 686 and 2" 690, about 10.5" wide 688, and a ½" radius 692. The plate can have a label 680 on the strike surface having indicia indicating as much plus any other information about certification level, graphics, tradenames, and the like. Plate 600*i* can also be curved or contoured 694 in a variety of manners as desired. As shown in FIG. 11, plate 600*i* can have three layers of Kevlar complete wrap 536, 538, 540 sealed with resin infusion for a homogenous finish and a LINEX coating complete. Within the Kevlar wraps from the strike face side downward the plate can include a ⅛" Gr5 titanium plate 524, a ⅜" ballistic metal foam layer 698, a 1/16" Gr5 titanium sheet 530 and a ⅜" thick lamination of alternating layers of SPECTRA/KEVLAR 526, 534. In a preferred embodiment 14 alternating layers are present. Total thickness 696 of plate 600*i* is about ¾".

The plate 600" of FIG. 12 can, for illustrative purposes only, can be about 6" by 6" height/width, and a ½" radius same as plate 600*i*. The plate can have a label 680*i* on the strike surface having indicia indicating as much plus any other information about certification level, graphics, tradenames, and the like. Plate 600*ii* can also be curved or contoured in a variety of manners as desired. As shown in FIG. 13, plate 600*ii* can have three layers of Kevlar complete wrap 536, 538, 540 sealed with resin infusion for a homogenous finish and a LINEX coating complete. Within the Kevlar wraps from the strike face side downward the plate can include a ⅛" Gr5 titanium plate 524, a ⅜" matrixed aluminum plate 522, a 1/66" Gr5 titanium sheet 530 and a ⅜" thick lamination of alternating layers of SPECTRA/KEVLAR 526, 534. In a preferred embodiment 14 alternating layers are present. Total thickness of plate 600*ii* is also about ¾".

Figure 14:
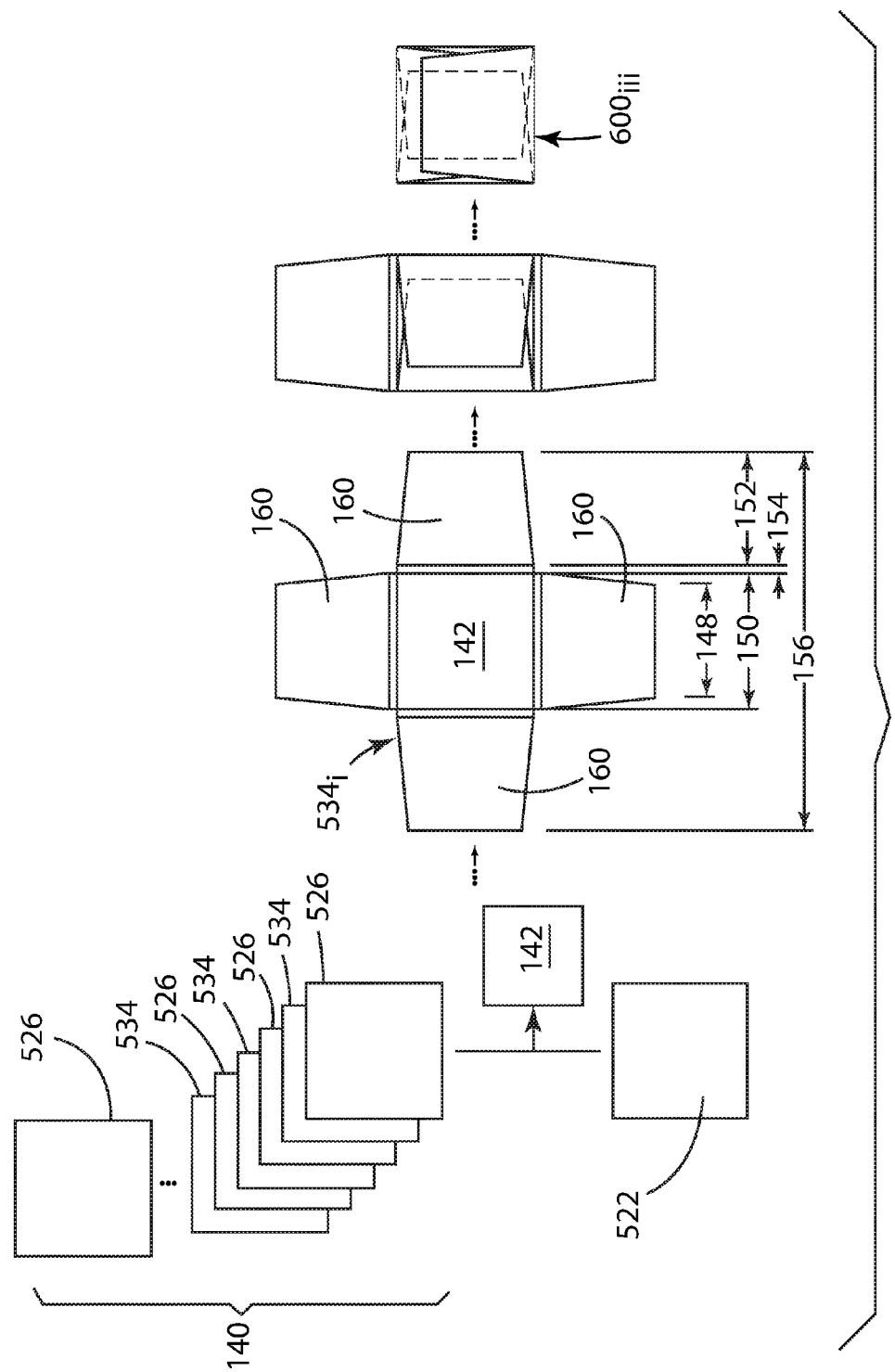
FIG. 14 illustrates an exemplary process flow of assembly steps of an exemplary embodiment according to one approach.
Figure 15:
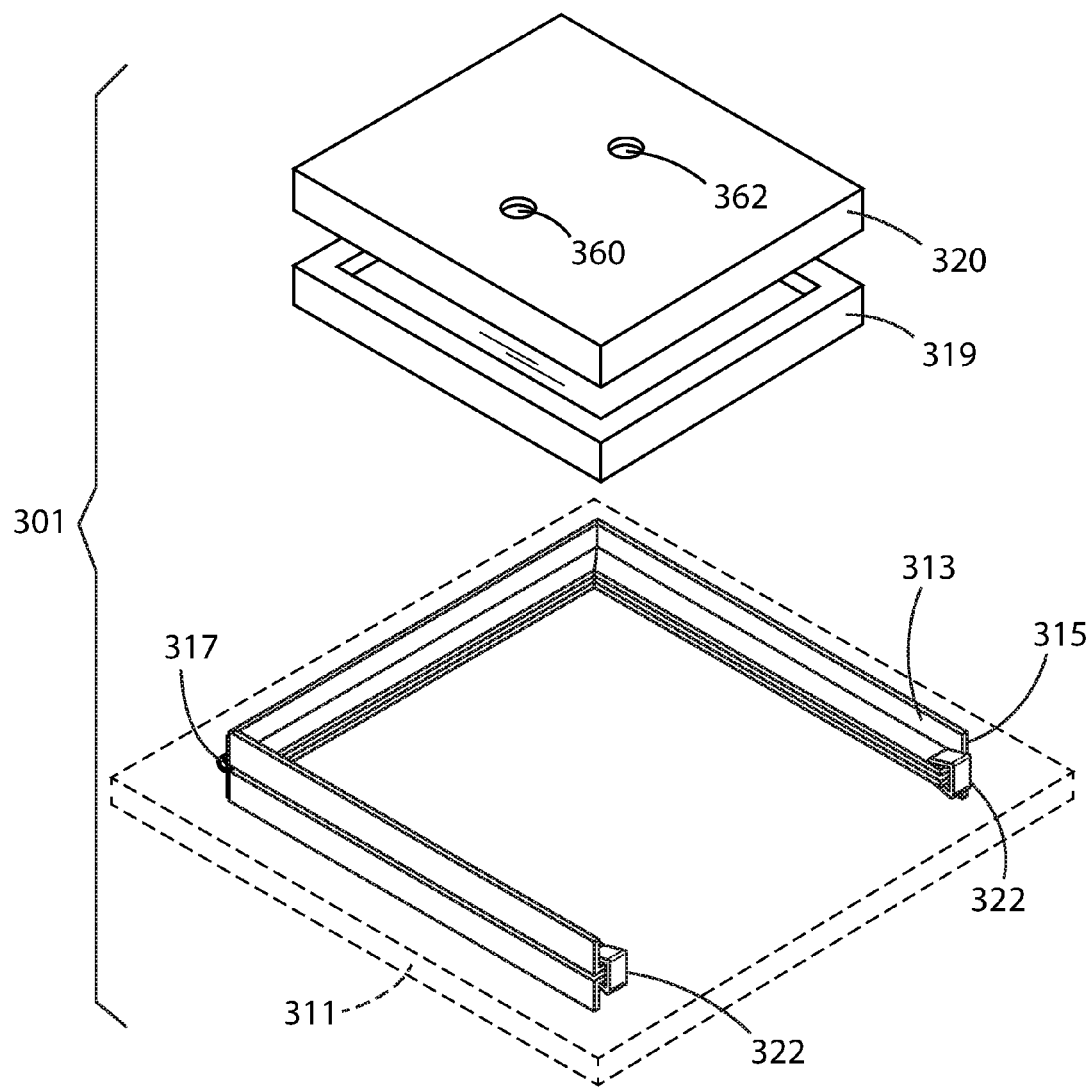

FIG. 14 illustrate a process flow of a progression of an armor plate assembly steps of an exemplary embodiment 600*iii*. In this embodiment, several layers, for example in FIG. 14 A alternating layers of KEVLAR 525 and SPECTRA 534 sheets are stacked on a matrixed aluminum plate 522 for form laminate 142, which is about 5" by 5" square. The number of layers can be up to 14 or more or less depending on the overall thickness of the final plate 600*iii* not exceeding a predetermined thickness. For example, some plates may be required to be no more than ¾" or 1" in thickness. Accordingly, alternating layers of SPECTRA/

KEVLAR 526, 534 can be added until that overall thickness (e.g., 1") is achieved. Laminate 142 is then wrapped by a spectra sheet 534*i* having a width 156 of about 16.75", four tabs 160 about length 152 of about 5", a base dimension 154 of about 0.375", a base width 150 of about 6" and a tapered end width 148 of about 5". The SPECTRA SHEILD 534*i* is then enveloped as shown to form plate 600*iii*.

Figure 16:
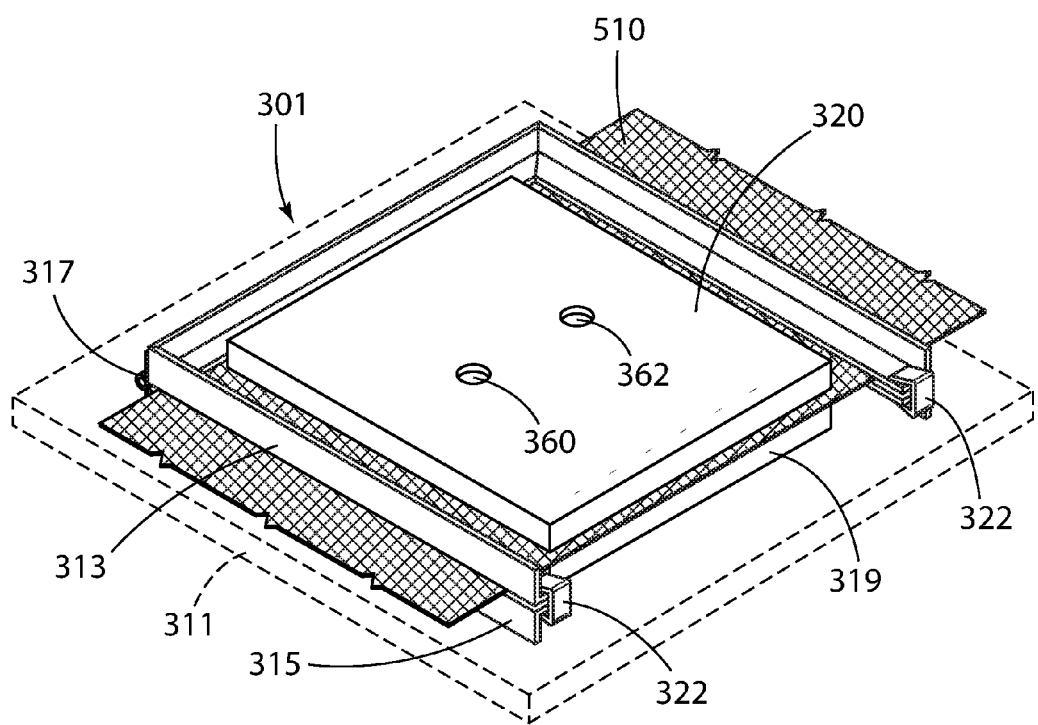

Another exemplary assembly approach to produce the matrixed aluminum plate 522 is shown in FIGS. 15-18. In this process a base frame 311 of device 301 holds mounted angled aluminum 'C' frame 315 attached to a reciprocal frame 313 by a hinge (such as a piano hinge) 317 that can be clamped together with butterfly clips 322 to hold the angled aluminum pieces and/or the mold pieces (319 and 320) in place. As shown though, mold halves 319 and 320 can be retained in place during the pouring of the molten aluminum step by other means known in the art. Mold piece 319 is a tray having an enclosed bottom and a reciprocal mold piece 320 of matching dimensions also having ports 360 to pour in the molten aluminum and vent 362 to allow air to escape. Many types of mold configurations are possible including vent and pour openings. This embodiment is shown to assist in the understanding of device 301. The inner dimension of the mold pieces 319 and 320 match the outer dimensions of a desired matrixed aluminum plate 522. The depth of tray 319 matches the position of the basalt weave layers within the final plate 522. As shown in FIG. 16, the basalt weave 510 is stretched across the frame pieces and clamped in place. At this point, the molten cast metal can be poured into the mold pieces to the desired thickness. FIG. 18 shows a cross sectional view of the frame with the basalt weave 510 in place. As shown the angled aluminum and the mold frame are clamped in place. It is noted that the basalt mesh/weave 510 can have a variety of sized pores/openings/spacing between the weave strands, such as shown at 364 in FIG. 17. Preferably the opening 364 is between ⅛" to ⅜" square. The weave opening though is configured to allow the molten aluminum to flow through the basalt mesh 510 in the casting process, but provide the strength needed for the desired strength needed for the configured application.

According to another approach, the present embodiments can utilize a proprietary sequenced manufacturing distribution process of materials and layers under controlled environmental conditions to ensure a consistent, reliable, and reproducible end product. Sheet metal rolling techniques can be employed and tested, including hot/cold rolling, stamping, perforating, and/or casting. Composite matrix materials can be evaluated to determine applicability for bonding, strength, and production benefits. Advanced fabrication techniques such as computer numerical control (CNC) milling, laser/water jet, and/or rapid prototyping can be utilized.

Performance criteria of a resultant composite base metal can be enhanced, and verified through rigorous testing and certification processes. Standard metrics such as, shear, tensile strength, and heat dissipation, can be measured and compared to create products that outperform current National Institute of Justice (NIJ) target threat level specifications. Other industry applications can be reviewed to determine potential candidates for future modification and enhancement. The targeted base metal material has several potential industry applications, including personal body armor and vehicle armor applications, structural and building component applications, marine applications, and electrical and electronic conductive applications. Following the initial proof-of-concept phase, prototype results can be used to determine suitability for various applications. Such as shown in the following table:

Aluminum treatments can also be considered for the present embodiments. Treatments of ferrous and nonferrous castings can receive different types of heat treatment. Aluminum castings can be heat treated using different combinations of operations, called tempers. Heat treatment of aluminum castings can result in homogenization, stress relief, and improved stability, machinability and mechanical properties.

The thermal processing can involve three basic processes—solution, quenching and aging. During solution, elements that will later cause age hardening are dissolved, undissolved constituents become spheroids, and the microstructure of the casting is homogenized. Homogenization distributes the alloying and impurity elements of a casting throughout its matrix, so the casting's properties will be more uniform.

Rapid cooling, or quenching cycles, retain the dissolved elements in the solution. Rapid quenching increases the response to age hardening, but it also creates residual stresses and distortion. Dissolved elements that are trapped in the solution during quenching eventually precipitate slowly at room temperature. After a time at room temperature, some alloys will harden appreciably. Aging can be accelerated by heating castings to intermediate temperatures in a process called artificial aging. Increased time at age temperature or aging at a greater temperature further evolves the precipitate structure, and hardness increases to a peak hardness condition. After the peak is hit, further aging, or overaging, reduces the hardness.

Aging also affects ductility. During overaging, a loss of hardening mechanisms permits extensive deformation to occur before fracture and ductility increases. Annealing, which is extreme overaging, maximizes ductility. Although each alloy and temper can have a recommended solution, quench and age times, these cycles are often customized to meet specific requirements for strength and ductility.

In another approach, additional titanium to the strike face to help degrade the rounds on the strike face gives the layered wraps more stopping opportunity. In one embodiment, a test fired AR15-5.56 FMJ round resulted with no penetration and limited BFD. This was with 0001 which did have a 12 gauge Titanium Layer on the strike-face as well. One embodiment utilized just a Layup and Matrixed Aluminum assembly with the 0.125 Titanium as the Strikeface and defeated the AR15/5.56 FMJ Round as well.

An AK47/7.62 round could be defeated with an embodiment having a 1.25 Strikeface/Matrixed Aluminum/0.125 Titanium/Spectra-Kevlar Layup. This could work for Level 3. However, significantly increased weight and cost would result. Optional embodiments could incorporate a Ballistic Foam to go before the matrixed aluminum.

Any references to the advantages, benefits, unexpected results, or operability of the present invention are not intended as an affirmation that the invention has been previously reduced to practice or that any testing has been performed. Likewise, unless stated otherwise, use of verbs in the past tense is not intended to indicate or imply that the invention has been previously reduced to practice or that any testing has been performed.

Although specific terms are employed herein, they are used in a generic and descriptive sense of only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one" or "single" or similar language is used. When used herein to join a list of the items, but does not exclude a plurality of items of the list.

While the embodiments have been described in conjunction with specific embodiments, it is evident that many alternatives, modifications and variations will be apparent to those skilled in the art in light of the foregoing description. Accordingly, the present embodiments attempt to embrace all such alternatives, modifications and variations that fall within the spirit and scope of the appended claims. Throughout this specification and the drawings and figures associated with this specification, numerical labels of previously shown or discussed features may be reused in another drawing figure to indicate similar features.

I claim:

1. A method of making an armor plate comprising the steps of: suspending a basalt weave within a mold; heating aluminum 6061 or 7075 alloy to a molten state; pouring the molten aluminum into the mold; cooling a resultant matrixed aluminum 6061 or 7075 alloy to ambient temperature; and laminating at least two layers of ballistic fiber to the matrixed aluminum to form a laminate.

2. The method of claim 1, wherein the aluminum 6061 or 7075 alloy is heated to about 1,400 degrees Fahrenheit.

3. The method of claim 1, wherein the laminate further comprises the step of vacuum infusing an elastic resin to seals all seams of the laminate.

4. The method of claim 1, wherein the step of suspending a basalt weave within a mold uses caplets.

5. The method of claim 1, further comprising the step of spraying the armor plate with a blast mitigation and protective coat in a single coating.

* * * * *